(12) United States Patent
Konaka et al.

(10) Patent No.: US 7,385,585 B2
(45) Date of Patent: Jun. 10, 2008

(54) USER INTERFACE DESIGNING APPARATUS

(75) Inventors: Hiroki Konaka, Tokyo (JP); Shin'ichiro Tsudaka, Tokyo (JP); Ryuichi Kobune, Tokyo (JP); Akira Sugimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 948 days.

(21) Appl. No.: 10/073,269

(22) Filed: Feb. 13, 2002

(65) Prior Publication Data

US 2002/0109721 A1    Aug. 15, 2002

(30) Foreign Application Priority Data

Feb. 14, 2001 (JP) .............................. 2001-037161

(51) Int. Cl.
*G09G 5/00* (2006.01)
*G06F 3/048* (2006.01)

(52) U.S. Cl. .................. 345/156; 715/856; 715/854

(58) Field of Classification Search ................ 345/700, 345/762, 156–184; 703/1–28; 717/100, 717/104, 110, 113, 120, 163, 168; 715/700–862
See application file for complete search history.

(56) References Cited

U.S. PATENT DOCUMENTS

| | | | |
|---|---|---|---|
| 5,371,683 A * | 12/1994 | Fukazawa et al. ............ | 716/11 |
| 5,542,034 A * | 7/1996 | Petler ............................ | 716/1 |
| 5,801,687 A | 9/1998 | Peterson et al. | |
| 6,681,383 B1 * | 1/2004 | Pastor et al. ................. | 717/126 |
| 6,701,513 B1 * | 3/2004 | Bailey ......................... | 717/109 |
| 6,853,963 B1 * | 2/2005 | Apfelbaum et al. ........... | 703/2 |
| 2002/0052941 A1 * | 5/2002 | Patterson .................... | 709/223 |
| 2003/0091329 A1 * | 5/2003 | Nakata et al. ............... | 386/52 |
| 2003/0167455 A1 * | 9/2003 | Iborra et al. ................ | 717/105 |

FOREIGN PATENT DOCUMENTS

| | | |
|---|---|---|
| EP | 0 262 759 | 4/1988 |
| EP | 0 622 729 A2 | 2/1994 |
| JP | 2000-137599 | 5/2000 |
| JP | 2000-276342 | 10/2000 |

OTHER PUBLICATIONS

SmartDraw.com, SmartDraw UML Center: How to Draw UML Diagrams, Founded 1994, Released 1995, pp. 1-43.*
Shimizu S et al: GUI Sider: A Scenario-Based Interaction Design environment for GUI dialogue. *Proceedings of IEEE., COMPAC 94.* Nov. 9, 1994.

* cited by examiner

*Primary Examiner*—Sumati Lefkowitz
*Assistant Examiner*—Srilakshmi K Kumar
(74) *Attorney, Agent, or Firm*—Leydig, Voit & Mayer, Ltd.

(57) ABSTRACT

A user interface designing apparatus for easily designing a user interface which can change display parts in accompanying state transitions for events by adding/deleting states and editing the display part and event handling in each state. The apparatus includes a state set editor for adding/deleting states of a composite display part having a multiplicity of states, an event handling editor for describing an event handling for a state transition in each state of the composite display part, an elementary display part memory for storing elementary display parts designed previously, and a state display editor for adding/deleting elementary display parts to be displayed in each state of the composite display part.

11 Claims, 3 Drawing Sheets

USER INTERFACE DESIGNING APPARATUS

BACKGROUND OF THE INVENTION

1. Field of the Invention

The present invention relates to a user interface designing apparatus which can be applied to designing of a user interface for, e.g., a portable telephone such as a cellular phone, a cellphone, a mobile phone or the like as well as a portable information terminal so that display parts (e.g. graphic or the like parts to be displayed) can be changed or interchanged in accompanying the state transitions for events.

2. Description of Related Art

For better understanding of the concept underlying the present invention, description will first be made in brief of a related technique known heretofore. FIG. 3 of the accompanying drawings is a block diagram showing a conventional user interface designing apparatus disclosed in, for example, in Japanese Patent Application Laid-Open Publication No. 137599/2000. The user interface designing apparatus disclosed in this publication is comprised of a GUI (Graphical User Interface) image designing device 101 which includes a layout design module 111 for designing, interactively, layout data, an attribute setting module 112 for setting property data and a generation opportunity or timing setting module 113 for setting generation opportunities or timings on a GUI part-by-part basis, a design data storing device 102 which includes storing units such as a layout data storing unit 121, a property data storing unit 122 and a generation timing data storing unit 123, a source program generating module 131 for generating a source program on the basis of design data, and an output unit 104 including a GUI image source program output module 141.

In the user interface designing apparatus of the structure described above, a source program for generating GUI parts on a GUI image screen and a source program of an access function is generated when a first generation timing is set or activated, while, when a second generation timing is set or activated, a source program of a dynamic generation access function is generated for generating the GUI part, as occasion requires.

With the conventional user interface designing apparatus of the arrangement described above, designing of the user interface parts accompanying the state transitions, as well as simulation of the user interface containing combinations thereof, cannot be implemented.

SUMMARY OF THE INVENTION

In the light of the state of the art briefed above, it is an object of the present invention to provide a user interface designing apparatus which can easily design a user interface capable of changing over or interchanging display parts (i.e., parts to be displayed) in accompanying the state transitions of the events by adding/deleting the states and editing the display parts and event handlings in each state.

In view of the above and other objects which will become apparent as the description proceeds, there is provided according to an aspect of the present invention a user interface designing apparatus which includes a state set editing means for adding/deleting states of a composite display part having a plurality of states, an event handling editing means for describing an event handling for state transition in each of the states of the composite display part, an elementary display part storing means for storing elementary display parts designed previously, and a state display editing means for adding/deleting elementary display parts to be displayed in each of the states of the composite display part.

In a preferred mode for carrying out the present invention, the user interface designing apparatus mentioned above may further include a composite display part storing means for storing the composite display parts as designed, wherein the state display editing means may be so arranged as to add/delete other designed composite display part.

In another preferred mode for carrying out the present invention, the state set editing means may be so arranged as to group several states of the composite display part. Additionally, the state display editing means may be so arranged as to edit en bloc the display parts which are displayed in common in the grouped state.

In yet another preferred mode for carrying out the present invention, the state set editing means may be so arranged as to group several states of the composite display part. In that case, and the event handling editing means may be so arranged as to edit en bloc the event handlings which are in common in the grouped state.

In still another preferred mode for carrying out the present invention, wherein the elementary display part stored in the elementary display part storing means has properties corresponding to size, position, external appearance and behavior, the user interface designing apparatus may further include an property editing means for editing the properties of the elementary display part added to each state or the state group of the composite display part.

In a further preferred mode for carrying out the present invention, the user interface designing apparatus may further include a composite display part property setting means for adding/deleting the properties representative of behaviors of the composite display part, wherein the property editing means may be so arranged as to edit the properties of the composite display part added to each state or the state group of the composite display part.

In a yet further preferred mode for carrying out the invention, the property editing means may be so arranged as to be capable of describing the properties of the elementary display part or alternatively the composite display part by referencing values of the properties of other elementary display part or alternatively other composite display part.

In a still further mode for carrying out the present invention, the state display editing means should preferably be so arranged as to display graphically disposition of the elementary display part or alternatively the composite display part in each state or state group of the composite display part while editing graphically properties and information concerning layout such as size or dimension or inter-part relation through direct manipulation with an input device or alternatively by activating directly the corresponding one of the property editing means.

In a mode for carrying out the present invention, the user interface designing apparatus should preferably further include a simulation means for simulating behavior of the composite display part stored in the composite display part storing means in conformance with manipulation input activated through an input device.

In another mode for carrying out the invention, the user interface designing apparatus should preferably further include virtual display parts storing means for storing virtual display parts having functions easy to realize virtually by the simulation means.

In yet another mode for carrying out the invention, the event handling editing means should preferably be so arranged as to set virtually an event difficult to realize practically and edit event handling for the event, while the simulation means should preferably be so arranged as to cause the virtual event to be issued through the medium of an input/output device to thereby simulate the processing for the virtual event issued with a relevant composite display part.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings.

Embodiment 1

Figure 1:
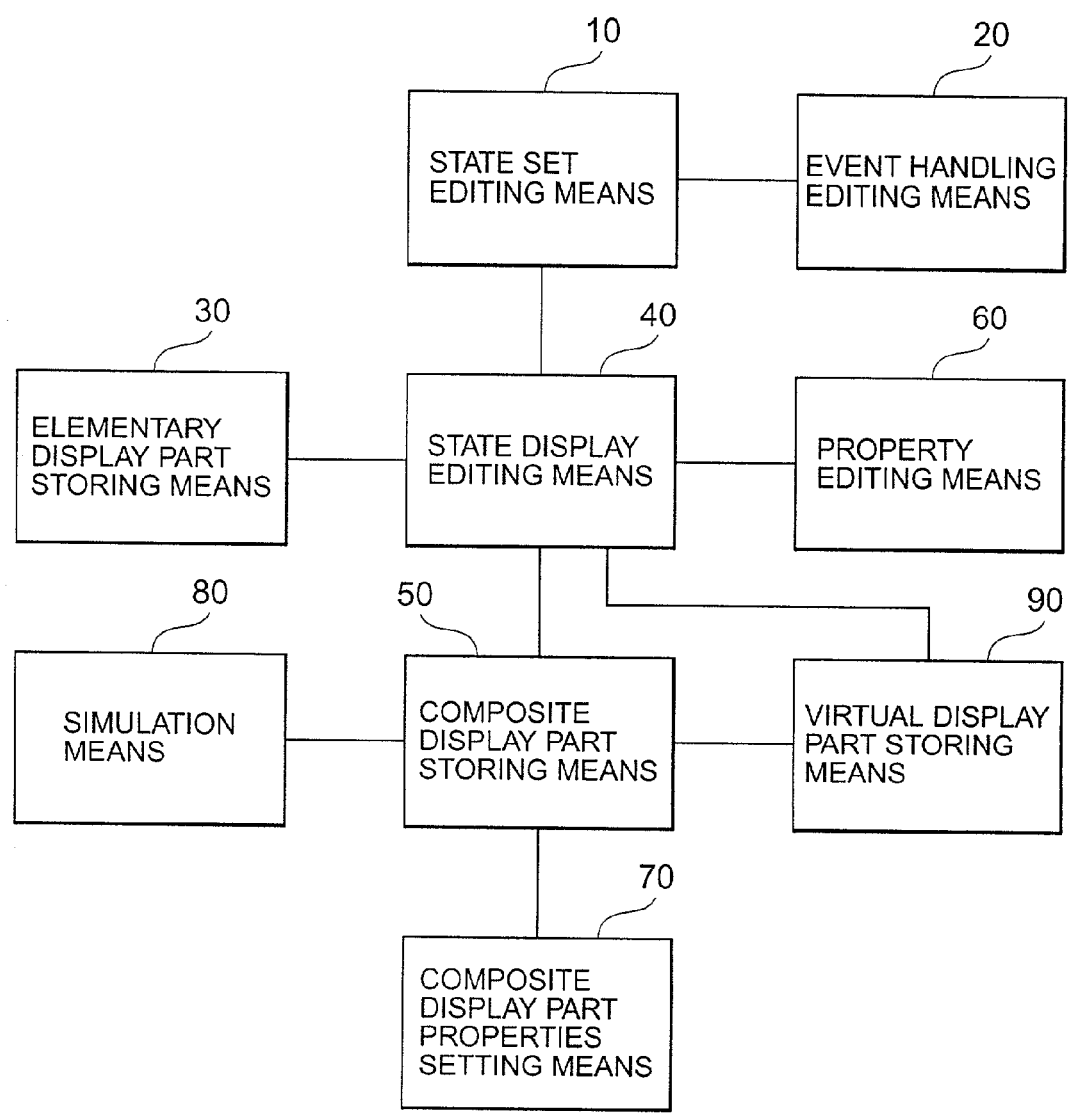
FIG. 1 is a block diagram showing generally and schematically a configuration of a user interface designing apparatus according to a first embodiment of the present invention.

FIG. 1 is a block diagram showing generally and schematically a configuration of the user interface designing apparatus according to a first embodiment of the present invention. As can be seen in the figure, the user interface designing apparatus now under consideration is comprised of a state set editing means 10, an event handling editing means 20, a basic or elementary display part storing means 30, a state display editing means 40, a composite display part storing means 50, an property editing means 60, a composite display part properties setting means 70, a simulation means 80 and a virtual display part storing means 90.

The combinatory or composite display part which is subjected to designing by the user interface designing apparatus has a state space composed of a plurality of states for making it possible to design and describe displays and behaviors such as state transitions in each of states.

The state set editing means 10 is used for prescribing the state space of the combinatory or composite display part. More specifically, the state set editing means 10 is so implemented as to be capable of adding a new state to the state space of the composite display part or deleting the state already existing in the state space. The individual states may be assigned with names or identifiers for discriminatively identifying the states from one to another. Further, in the case where a plurality of states are accommodated within the state space, a given one of these states may be set as an initial state in order to designate the state which is to be firstly assumed by the composite display part upon displaying thereof. Further, a function for editing a state group which is composed of several states may be implemented. In that case, such arrangement may be adopted that by designating the state individually or the state group, the corresponding event handling editing means 20 or state display editing means 40 can be activated.

The event handling editing means 20 is employed for designing and describing the behaviors of the combinatory or composite display part in each of the states or state group. More specifically, an event handler is set up for prescribing in what manner which type of the event is to be handled in each state or state group.

As the types or sorts of the events, there may be mentioned a key event indicative of actuation of some key, a mouse event indicative of click of a mouse button, a timer event taking place upon lapse of a designated or predetermined time from the time point at which a given state has been entered, a release event which occurs after a designated or predetermined time has lapsed from the last input operation with the key or mouse, an entry event taking place upon entering a given state or state group, an exit event taking place when exit is made from a given state or state group, a sound input event taking place upon inputting of sound or voice, an image input event taking place upon inputting of image data from a camera or the like, a motion event occurring due to motion or movement of apparatus and others. Additionally, there may be conceived an internal event employed for communication and synchronization or the like between or among the composite display parts and others, events difficult or too complicated for realization with the practical user interface device or the event associated with the function being currently developed, and a virtual event representing such an event which is difficult to simulate with the simulation means 80 and which is provisionally set for the purpose of enabling to design a corresponding event handler, and so forth. Further, properties for identifying the events in details, e.g. properties Ski representing which of the keys has been pushed in the key event, how long the designated or predetermined time is set in the case of the timer event and so forth, may be provided, respectively, for the various events mentioned above.

In the event handlers, there are set up the types of events, the properties thereof and the actions prescribing the processings to be executed upon occurrence of corresponding events. As the processings prescribed by the actions, there can be conceived the changes of the internal state of the user interface device and the properties of the display parts described hereinafter, transmission or conveyance of the internal events to other composite display parts and others, execution of some program code(s) and the state transition of the composite display part. Additionally, a so-called guard may be set in the event handler in order to enable the decision as to whether or not the event should be handled in view of the internal state of the user interface device and inhibit the event handling as the case may be. For describing the actions and the guard, it can be conceived to use, for example, an interpreter-executable programming language.

The basic or elementary display part storing means 30 serves for storing therein the basic or elementary display parts collectively referred to also as the elementary display parts already designed in advance. As the elementary display parts, there may be enumerated buttons, labels, text input forms, check boxes, menus and the like. Besides, panels and frames for disposing therein the elementary display parts and the like may also be mentioned. For the elementary display part of a same sort, a desired number of parts which are specific with regard to the disposition, size, color, character strings to be displayed and other may be prepared in advance. However, by preparing these items as the properties which can be changed or modified so that the proper elementary display part can be edited by the property editing means 60 upon designing, the number of the elementary display parts to be prepared previously can be reduced, while the versatility (general-purpose-nature) of the individual elementary display parts, can be enhanced.

The state display editing means 40 serves for newly adding the display parts to be displayed to the individual states or state group of the composite display part or alternatively deleting the display parts already registered or added to the individual group or the state group.

As the display parts, there may be mentioned, for example, the elementary display parts stored in the elementary display part storing means 30, the composite display parts stored in the composite display part storing means 50 destined for storing the composite display parts already designed or the virtual display parts stored in the virtual display part storing means 90.

In this conjunction, the disposition of the display parts to be displayed in the individual states or state group of the composite display part may graphically be displayed together with the external appearance thereof so that they can be manipulated directly with the mouse to thereby edit graphically the property/information concerning the layout such as the dimension or size or inter-part relation may graphically be edited or the property editing means 60 for the properties corresponding to the individual display parts. Incidentally, the composite display part storing means 50 is destined for storing the composite display parts designed already.

The property editing means 60 serves for setting the values of the properties of the display parts such as the elementary display parts and the composite display parts. As the properties, there can be conceived the generalized properties such as the disposition and the sizes. Besides, in the case of the button, for example, there can be conceived such properties which depend on the species of the display parts such as the character string to be displayed and color thereof, background color, event which takes place upon pushing of the button and others. Besides, the name, or identifiers may be imparted to the display parts for discriminatively identifying the display parts from one to another. In this conjunction, the property editing means 60 may be so designed as to realize the editing method in accordance with the types of these properties. Besides, it is conceived that the property of given one of the display parts can be set by referencing the value of the property of the other display part.

The composite display part properties setting means 70 serves for adding and/or deleting the property(s) of the composite display part. Upon addition of the property, the type of species of the property, the name thereof, the initial value thereof, the referential relation and others are set. Owing to this feature, the external appearance and the behavior of the composite display part can conveniently be altered or changed by setting correspondingly the relevant properties.

The simulation means 80 is designed for simulating the behavior of the composite display part.

For simulating the composite display part, the state of the composite display part is set to the initial state, and the display part corresponding to the initial state or the state group to which the concerned initial state belongs are generated, whereon the designated layout is displayed after the property initialization while the corresponding event handlers are activated. The activated event handler then waits for occurrence of the corresponding event while activating the timer required as the case may be, as described later on. The display of each display part is determined in dependence on, for example, the property(s). Furthermore, in the case where other composite display part is contained or included in the part to be displayed, the processing described above is executed repetitively for the composite display part generated.

In some case, generation of the event can be simulated intactly. However, the event which corresponds to, for example, pushing of the button representing a key of the user interface device may be simulated by the mouse click to thereby generate the key event designated by the property(s) or the like of the button, whereon the key event may be handled by the event handler of the proper display part (e.g. so-called focused display part). In the case of the timer event, the timer is put into operation upon activation of the corresponding event handler to thereby allow the event to take place after lapse of a predetermined time, which event is then handled by the above-mentioned handler. In the case of the release event, the timer may be reset every time the key event or the like takes place. Further, in the case where the event handler corresponding to the virtual event is activated, a specific button for generating that event, for example, may be displayed on the display. When that button is selected, the virtual event is generated to be subsequently handled by the above-mentioned event handler. On the other hand, when the event handler for the entry event of a given state or state group is available, the processing of this event handler can be executed upon transition to that given state or state group.

In the processing of the event handler corresponding to the event, the guard, is firstly evaluated, if it exists, whereon it is determined, whether the processing of action is performed or not. Unless the guard exists or if it is decided that the processing of action should be performed as a result of the evaluation of the guard, processing of the action is carried out. In this conjunction, it should be noted that the guard and the action may be described by some appropriate programming language to be executed with the aid of the interpreter, as described hereinbefore. Furthermore, with the aim of increasing the response or reaction speed to a specific event, priority levels may be assigned to the processings in dependence on the species or types of the events. Additionally, depending on the type of the event, there may be prepared a procedure for searching the display part which has the event handler capable of processing the event concerned. By way of example, in the case of the key event, unless the so-called focused display part is in the position to process that key event, the event handler corresponding to that key event may be searched from the event handlers assigned to the panel on which the relevant display parts are disposed or those assigned to the composite display parts to thereby execute the processing of such key event. Additionally, in the processings for the guard and the action, the display parts may be managed such that given one of the display parts references the value of the property of other display part(s) or alternatively the named display parts may be managed with the aid of a so-called associated array to thereby allow the display parts to be referenced in terms of the names.

When a given composite display part makes transition to another state as a result of the processing of action by the event handler, the exit handler corresponding to the current state or the current state group which is not common to the succeeding state is executed, if such exit handler is present or available. The display parts which correspond to the current state group not common to the succeeding state and which correspond to the current state are inhibited from being displayed and erased. Further, the event handlers corresponding to these display parts are deactivated. If the part to be erased is a composite display part, erasure of the display parts appearing in that composite display part and deactivation of the event handlers are performed recursively. On the other hand, upon deactivation of the event handler, the processings for invalidating the corresponding timer and erasing the button for generating the corresponding virtual event are executed, as occasion demands. Subsequently, generation and display of the display parts corresponding to the new state as well as the new state group which is not common to the current states of the state group to which the new state belongs as well as activation of the event handlers is carried out through the procedure described hereinbefore.

The virtual display part storing means 90 stores virtual display parts having functions for facilitating virtual realization by the simulation means 80, which functions are difficult to realize or very complicative for the practical user interface apparatus or are currently being developed.

Next, referring to FIG. 2, description will be made of in what manner the display parts are changed over or interchanged in accompanying the state transitions in the composite display part designed by using the user interface designing apparatus according to the embodiment of the present invention described above. Incidentally, for the simplification of description, it is presumed that each of the composite display parts has the initial state represented by the state 1, the event handler for transition of one state to another is set for each of the states and that the state group is not set up. Further, it is presumed that in precedence to display of the display part, instance thereof is created.

Figure 2:
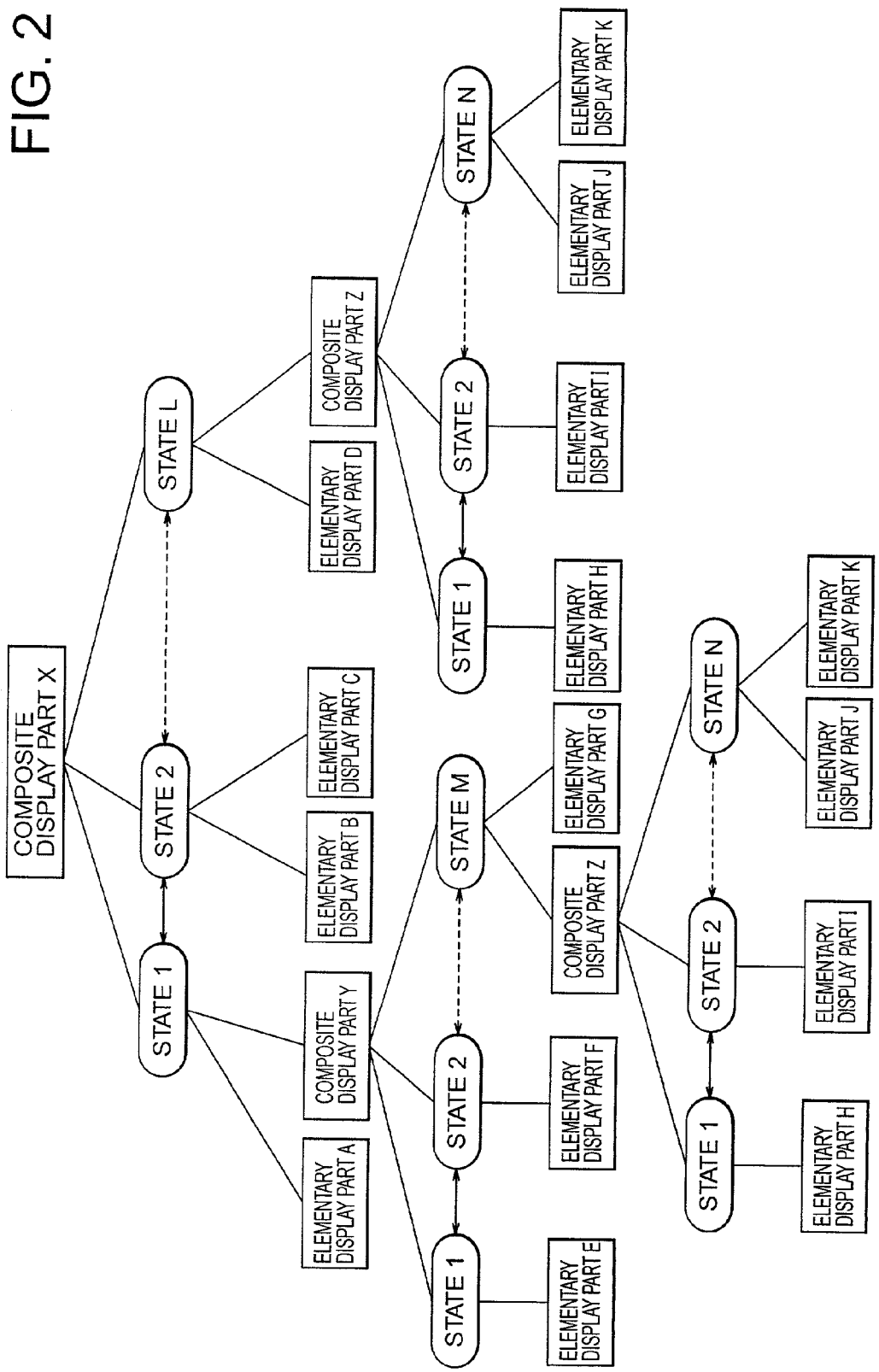
FIG. 2 is a hierarchical diagram for illustrating composite display parts.
Figure 3:
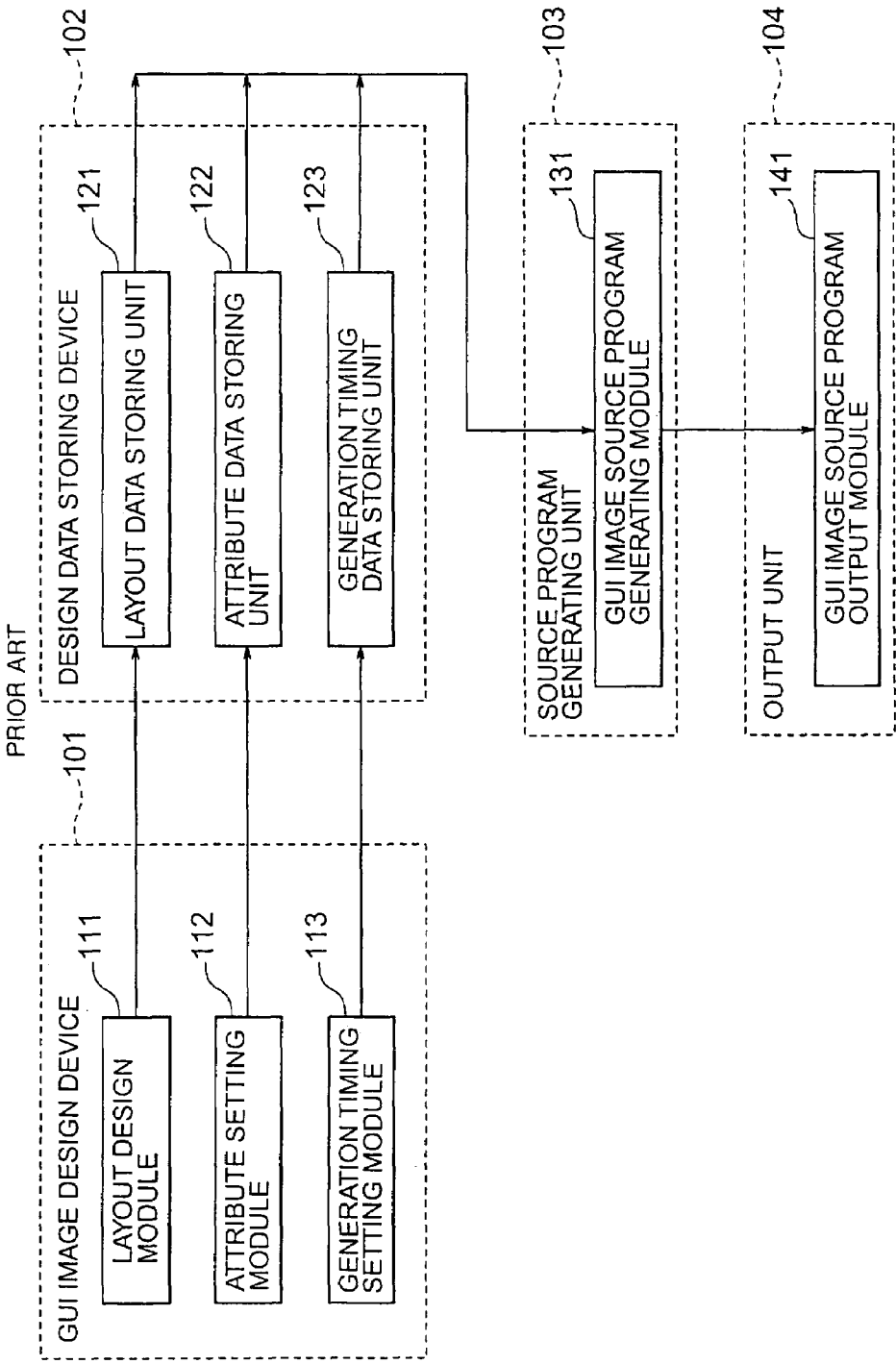
FIG. 3 is a block diagram showing generally and schematically a configuration of a user interface designing apparatus known heretofore.

Referring to FIG. 2, a composite display part X has L states inclusive of a state 1 to a state L on the assumption that an elementary display part A and a composite display part Y are used in the state 1, an elementary display part B and an elementary display part C are used in the state 2 and that an elementary display part D and a composite display part Z are used in the state L.

On the other hand, the composite display part Y has M states inclusive of a state 1 to a state M on the assumption, by way of example, that an elementary display part E is used in the state 1, an elementary display part F is used in the state 2 and that a composite display part Z and an elementary display part G are used in the state M.

Further, the composite display part Z has N states inclusive of a state 1 to a state N on the assumption, by way of example, that an elementary display part H is used in the state 1, an elementary display part I is used in the state 2 and an elementary display part J and an elementary display part K are used in the state N.

When the composite display part X is displayed on the condition that the individual display parts are designed as described above, the composite display part X assumes at first the state 1, whereby the elementary display part A and the composite display part Y are displayed. The composite display part Y also assumes the state 1 in which the elementary display part E is displayed.

Subsequently, when the composite display part Y assumes the state M as a result of the state transition brought about by some event handling, the elementary display part E makes disappearance while a composite display part Z is displayed together with an elementary display part G. The composite display part Z assumes at first the state 1 in which the elementary display part H is displayed. On the other hand, the elementary display part A displayed in the composite display part X remains being displayed.

Assuming that the state transition takes place in the composite display part Z, as a result of which the composite display part Z assumes a state N, then the elementary display part H disappears while a elementary display parts J and K are displayed.

At this juncture, it is noted that the composite display part X makes transition to the state 2, as a result of which all the parts except for the composite display part X disappear, while the elementary display parts B and C are displayed. Further, when the composite display part X makes transition to the state L, then the elementary display parts B and C disappear once, and the elementary display part D and the composite display part Z are displayed. The composite display part Z assumes at first the state 1 in which the elementary display part H is displayed, as described above.

In the foregoing, description has been made concerning the changeover or interchange of the display parts. It is however to be added that similar processings may be carried out for activation and inactivation of the event handlers corresponding to the individual states, respectively.

As will be appreciated from the foregoing description, the user interface designing apparatus according to the first embodiment of the present invention is comprised of the state set editing means 10 for adding/deleting states of the composite display part which includes a plurality of states, the event handling editing means 20 for describing the event handling such as for the state transition in each of the states of the composite display part, the elementary display part storing means 30 for storing elementary display parts designed previously, and the state display editing means 40 for adding/deleting the elementary display parts to be displayed in each of the states of the composite display part. With the user interface designing apparatus of the structure described above, the user interface capable of changing over the display parts in accompanying the states transitions taking place for events can easily be designed through addition/deletion of the states, edition of the event handling in each state and addition/deletion of the elementary display parts.

Further, by providing the composite display part storing means 50 for storing the designed composite display parts and by arranging the state display editing means 40 so as to be capable of adding/deleting other designed composite display parts, it is possible to dispose/delete the other composite display part in a given state of the composite display part. Thus, in the case illustrated, for example, in FIG. 2, the composite display part Z can be designed at one time. To say in another way, even the complicated or complex user interface involving partially independent state transitions can be designed with high visibility or clearness by combining hierarchically a plurality of composite display parts designed by one and the same user interface designing apparatus while preventing combinatorial explosion which may otherwise occur upon handling within one state space.

Further, by arranging the state set editing means 10 so as to group several states of the composite display part while arranging the state display editing means 40 so as to edit en bloc the display parts which are displayed in common in the grouped state, it is possible to simplify and facilitate the edition of the display parts which are displayed in common in several states.

Further, by arranging the state set editing means 10 so as to group several states of the composite display part while arranging the event handling editing means 20 so as to edit en bloc the event handlings which are in common, edition of the event handlings which are in common in several states can be simplified.

Further, by imparting the elementary display part stored in the elementary display part storing means 30 with the properties corresponding to the size, position, external appearance and/or the behavior and providing the property editing means 60 for editing the properties of the elementary display part added to each state or the state group of the composite display part, the disposition, external appearance, behavior and the like desired by the designer can flexibly be designed with high efficiency without need for preparing a large number of same type display parts which differ from one to another in respect to the disposition, external appearance, the behavior and the like. By virtue of this feature, the user interface for the composite display part in each state thereof can be realized with enhanced efficiency.

Furthermore, by providing additionally the composite display part property setting means 70 for adding/deleting the properties corresponding to the size, position and the behavior of the composite display part and by arranging the property editing means 60 so as to edit the properties of the composite display part added to each state or the state group of the composite display part, it is possible to change or alter the external appearance, behavior and the like by setting the properties correspondingly. Thus, the user interface for the composite display part in each state thereof can efficiently be implemented by altering the properties thereof without need for preparing large number of same type display parts which differ from one another in respect to the external appearance and the behavior.

Besides, by arranging the property editing means 60 so as to be capable of describing the properties of the elementary display part or the composite display part by referencing the values of the properties of other elementary display parts or those of other composite display part, designing of the user interface for altering the external appearance, behavior and the like in conformance with the properties of the other display parts can be much facilitated.

Additionally, by arranging the state display editing means 40 so as to display graphically the disposition and the external appearance of the elementary display part or the composite display part in each state or state group of the composite display part while editing graphically the properties and the information concerning the layout inclusive of the size or the inter-part relation through direct manipulation with a mouse or by activating directly the corresponding one of the property editing means 60, it is possible to carry out efficiently moditication of the disposition and the properties while intuitively grasping the disposition of the display parts in each state of the composite display part.

Besides, by providing additionally the simulation means 80 for simulating the behaviors of the composite display part stored in the composite display part storing means 50 in conformance with manipulation input activated through the input device such as a touch panel, a mouse, a keyboard or the like, it is possible to proceed with designing while verifying the behaviors of the composite display part which is being designed.

Moreover, by providing additionally the virtual display part storing means 90 for storing the virtual display parts having the functions easy to realize virtually by the simulation means 80 as the parts to be displayed in each state or state group of the composite display part, which functions are difficult or much complicative to realize with the practical user interface device or being currently developed, the designing procedure can easily be proceeded with while reviewing the new user interface function at earlier stage of designing.

Furthermore, by arranging the event handling editing means 20 so as to set virtually the event which is difficult or much complicative to realize with the practical user interface device or the event relating to the function which is being developed or the event difficult to simulate with the simulating means 80, while arranging the simulation means 80 so as to make the virtual event be issued through the medium of an input/output device to thereby simulate the processing for the issued virtual event with a relevant composite display part, it is possible to design and ascertain without difficulty the operation of the user interface for the event which is difficult or much complicative to realize with the practical user interface device or the event which relates to the function being developed or which is the event difficult to simulate with the simulating means.

Effects of the Invention

According to the teachings of the present invention, there can be obtained various advantageous effects, which will be elucidated below.

1. The user interface designing apparatus according to the present invention includes the state set editing means for adding/deleting states of the composite display part having a plurality of states, the event handling editing means for describing the event handling for the state transition in each of the states of the composite display part, an elementary display part storing means for storing the elementary display parts designed previously, and the state display editing means for adding/deleting the elementary display parts to be displayed in each of the states of the composite display part. With the structure of the user interface designing apparatus of the structure described above, the user interface involving the state transition for the event can be designed with ease.

2. With the user interface designing apparatus set forth in the above paragraph 1 and further including the composite display part storing means for storing the designed composite display parts, wherein the state display editing means is imparted with the function for adding/deleting other designed composite display part, it is possible to design even the complicated or complex user interface involving partially independent state transitions with high visibility or clearness by combining the composite display parts designed while preventing combinatorial explosion of the states.

3. With the structure of the user interface designing apparatus set forth in the above paragraph 1 or 2, the state set editing means is imparted with the function for grouping several states of the composite display part, while the state display editing means is imparted with the function for editing en bloc the display parts which are displayed in common in the grouped state, it is possible to simplify the edition of the display parts which are displayed in common in several states.

4. With the structure of the user interface designing apparatus which is set forth in one of the above paragraphs 1 to 3 and in which the state set editing means 10 is imparted with the function for grouping several states of the composite display part with the event handling editing means being imparted with the function for editing en bloc the event handlings which are in common in the grouped state, edition of the event handlings which are in common in several states can be simplified.

5. With the structure of the user interface designing apparatus which is set forth in one of the above paragraphs 1 to 4 and in which the elementary display part stored in the elementary display part storing means has properties corresponding to size, position, external appearance and behavior Wherein the properties editing means for editing the property of the elementary display part added to each state or the state group of the composite display part is additionally provided, it is possible to design the user interface involving the state transitions with improved efficiency by setting the disposition, external appearance and the behavior of the elementary display part as desired by altering the property without need for preparing the parts in view of the disposition, external appearance, behavior and the like.

6. With the structure of the user interface designing apparatus which is set forth in the above paragraph 5 and in which the composite display part properties setting means 70 is additionally provided for adding/deleting the property representative of behaviors of the composite display part, wherein the property editing means 60 is imparted with the function for editing the properties of the composite display part added to each state or the state group of the composite display part, it is possible to design with high efficiency the user interface involving the state transitions by setting for use the disposition, external appearance, behavior and the like of the composite display part by altering the properties thereof without need for preparing a large number of same type display parts which differ from one to another in respect to the disposition, external appearance, the behavior and the like.

7. With the structure of the user interface designing apparatus which is set forth in the the above paragraphs 5 or 6 and in which the property editing means is imparted with the function for describing the properties of the elementary display or the composite display part by referencing values of the properties of other elementary display part or those of other composite display part, it is possible to facilitate designing of the user interface for altering the external appearance, behavior and the like in conformance with the properties of the other display parts.

8. With the structure of the user interface designing apparatus which is set forth in one of the above paragraphs 1 to 7 and in which the state display editing means is imparted with the function for displaying graphically disposition of the elementary display part or the composite display part in each state or state group of the composite display part while editing graphically properties and information concerning layout inclusive of size or inter-part relation through direct manipulation with an input device or by activating directly a corresponding one of the property editing means, it is possible to carry out efficiently correction of the disposition and the properties while grasping intuitively the disposition of the display part in each state of the composite display part.

9. With the structure of the user interface designing apparatus which is set forth in one of the above paragraphs 1 to 8 and in which the simulation means is provided for simulating the behavior of the composite display part stored in the composite display part storing means in conformance with manipulation input activated through an input device, it is possible not only to simulate the user interface but also to proceed with designing while confirming the behavior of the composite display part which is being designed, which in turn means that designing of the user interface involving the state transition can be proceeded with.

10. With the structure of the user interface designing apparatus set forth in the above paragraph 9 and which includes additionally the virtual display part storing means for storing the virtual display parts having functions easy to virtually realize by the simulation means, it is possible to design and simulate the user interface by using the virtual display parts, whereby the designing procedure can easily be proceeded with while reviewing the new user interface function at earlier stage of designing.

11. With the structure of the user interface designing apparatus which is set forth in the above paragraph 9 or 10 and in which the event handling editing means is imparted with the function for setting virtually the event difficult to realize practically and editing the event handling for the event, wherein the simulation means is imparted with the function for making the virtual event be issued through the medium of an input/output device to thereby simulate the processing for the issued virtual event with a relevant composite display part, it is easy to design and verify the user interface for the event which is difficult or much complicative to realize with the practical user interface device or the event relating to the function which is being developed or the event difficult to simulate with the simulating means.

Many modifications and variations of the present invention are possible in the light of the above techniques. It is therefore to be understood that within the scope of the appended claims, the invention may be practiced otherwise than as specifically described.

What is claimed is:

1. A user interface designing apparatus, comprising:
   state set editing means for adding/deleting states of a composite display part having a plurality of states, wherein the composite display part is displayed to a user as part of a user interface designed by the user interface designing apparatus;
   event handling editing means for editing event handling for a state transition in each of the states of the composite display part;
   elementary display part storing means for storing elementary display parts designed previously;
   state display editing means for adding/deleting elementary display parts to be displayed in each of the states of the composite display part, for adding/deleting another composite display part in each of the states of the composite display part, and for hierarchically combining the composite display parts; and
   composite display part storing means for storing the composite display parts as designed, wherein said state display editing means is arranged to add/delete another composite display part as designed.

2. The user interface designing apparatus according to claim 1, wherein said state set editing means groups several states of the composite display part in a grouped state, and edits, en bloc, the display parts which are commonly displayed in the grouped state.

3. The user interface designing apparatus according to claim 1, wherein
   said state set editing means is arranged to group several states of the composite display part in a grouped state, and
   said event handling editing means edits, en bloc, the event handlings which are common in the grouped state.

4. The user interface designing apparatus according to claim 1, wherein the elementary display part stored in said elementary display part storing means has properties corresponding to size, position, external appearance, and behavior, and further comprising property editing means for editing the properties of the elementary display part added to each state or group of states of the composite display part.

5. The user interface designing apparatus according to claim 4, further comprising composite display part property setting means adding/deleting the properties representative of behaviors of the composite display part, wherein said property editing means edits the properties of the composite display part added to each state or group of states of the composite display part.

6. The user interface designing apparatus according to claim 4, wherein said property editing means describes the properties of the elementary display part or, alternatively, the composite display part by referencing values of the properties of another elementary display part or, alternatively, the properties of another composite display part.

7. The user interface designing apparatus according to claim 4, wherein said state display editing means displays, graphically, disposition of the elementary display part or, alternatively, the composite display part in each state or group of states of the composite display part while editing, graphically, properties and information concerning layout, such as size or dimension or inter-part relation, through direct manipulation with an input device.

8. The user interface designing apparatus according to claim 4, wherein said state display editing means displays, graphically, disposition of the elementary display part or, alternatively, the composite display part in each state or group of states of the composite display part while editing, graphically, properties and information concerning layout, inclusive of size or inter-part relation through direct manipulation with an input device or, alternatively, by activating directly a corresponding one of said property editing means.

9. The user interface designing apparatus according to claim 1, further comprising simulation means for simulating behavior of the composite display part stored in said composite display part storing means in conformance with manipulation input activated through an input device.

10. The user interface designing apparatus according to claim 9, further comprising virtual display part storing means for storing virtual display parts having functions realized virtually by said simulation means.

11. The user interface designing apparatus according to claim 9, wherein said event handling editing means sets a virtual event and edits event handling for the event, and said simulation means issues the event, virtually, through an input/output device to simulate the processing for the virtual event issued, with a relevant composite display part.

* * * * *